July 27, 1943.　　　J. WAUTERS　　　2,325,560
ORDNANCE
Filed July 24, 1939　　　8 Sheets-Sheet 1

July 27, 1943.　　　　J. WAUTERS　　　　2,325,560
ORDNANCE
Filed July 24, 1939　　　8 Sheets-Sheet 3

Inventor:
Jean Wauters
By: Mason & Porter
Attorneys

July 27, 1943.    J. WAUTERS    2,325,560
ORDNANCE
Filed July 24, 1939    8 Sheets-Sheet 4

Inventor:
Jean Wauters
By Mason & Porter
Attorneys

July 27, 1943.  J. WAUTERS  2,325,560
ORDNANCE
Filed July 24, 1939  8 Sheets-Sheet 7

Inventor:
Jean Wauters
By: Mason & Porter
Attorneys

July 27, 1943.  J. WAUTERS  2,325,560
ORDNANCE
Filed July 24, 1939  8 Sheets-Sheet 8
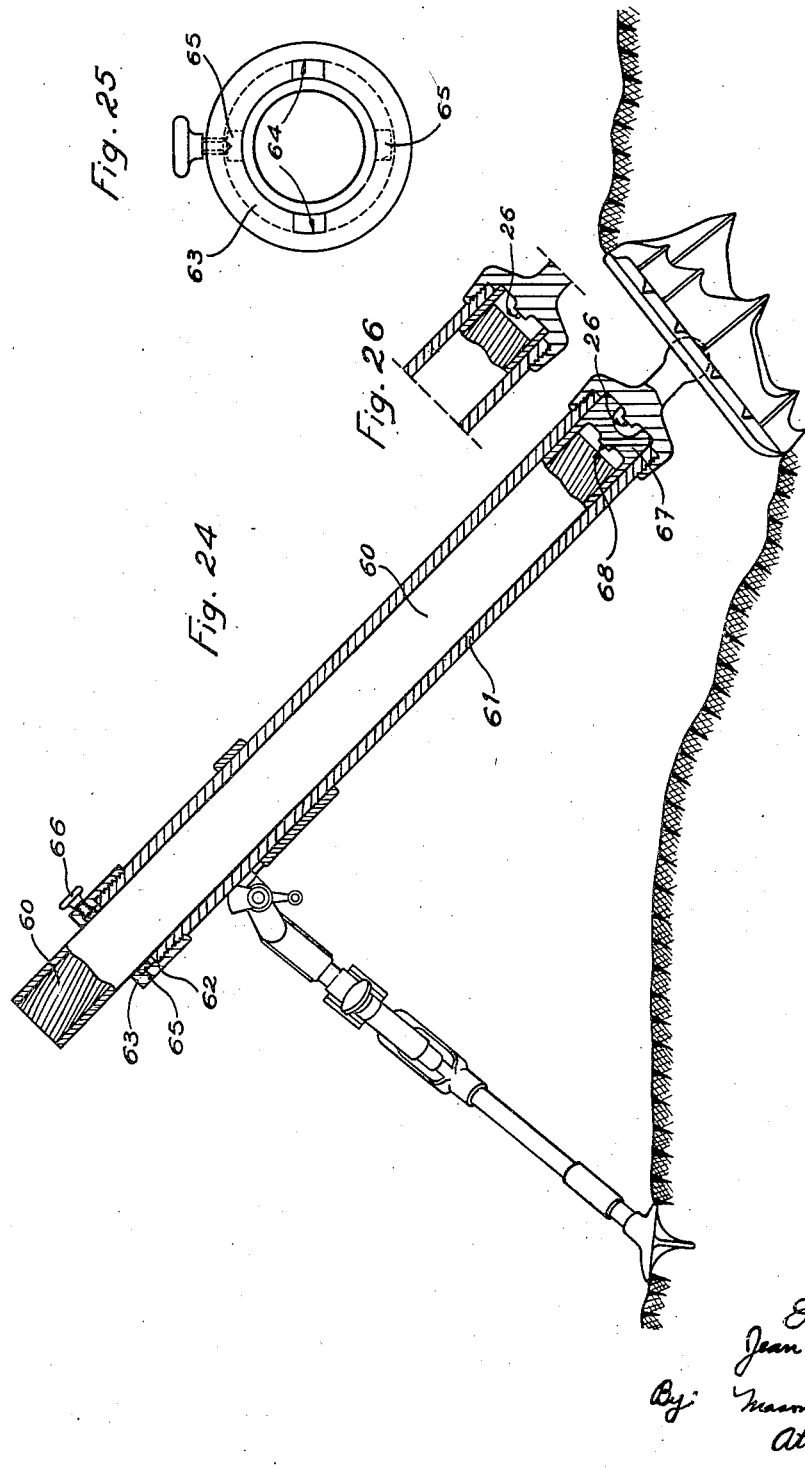

UNITED STATES PATENT OFFICE 2,325,560

ORDNANCE

Jean Wauters, Brussels, Belgium; vested in the Alien Property Custodian

Application July 24, 1939, Serial No. 286,280
In Luxemburg July 30, 1938

1 Claim. (Cl. 89—1)

The present invention relates to ordnance, more particularly to guns of the howitzer type, such as trench mortars, and to projectiles peculiarly adapted to cooperate with those guns.

The guns employed up to the present time fall into two very distinct categories: (1) that of rifled bore guns and, (2) that of smooth bore guns. The former are generally employed for flat or low elevation fire at comparatively long ranges; the others, which are mostly mortars, firing at high angles at much shorter ranges. These two categories of guns supplement one another in the sense that, owing to their extremely curved trajectory, smooth bore mortars make it possible to reach targets concealed behind a mask, a thing which cannot be effected with rifled weapons the angle of fire of which is insufficient and moreover limited owing to the fact that, beyond a certain angle, their projectiles cannot preserve a correct tangential position along their trajectory nor fly point first forward—they wobble and lose all stability and accuracy.

Another advantage of smooth bore weapons is their light weight. As the projectile does not have to be forced into the grooves of the rifling it is possible to employ low propelling pressures, thus permitting a great reduction in the weight of the gun and of its mounting. This leads to great mobility of the weapon which offers obvious tactical advantages.

On the other hand, smooth bore guns have the disadvantage of only firing at shorter ranges. The finned projectiles they utilise must, in order to be steady, have their centre of gravity set distinctly forward of the centre of thrust in order that the stabilising couple set up by the fin assembly may be as active as possible without, however, reaching an excessive magnitude. In the case of such shells, this leads to the adoption of outer contours incompatible with long range fire from an aerodynamic point of view.

The present invention aims at means making it possible to fire equally well, with one and the same weapon, either projectiles stabilised by gyratory motion, or projectiles stabilised by fins. Said means comprise, on the one hand, a special conformation of the rifling, and, if necessary, of the gun chamber, and, on the other hand, a special fitting out of the projectiles of the two aforementioned categories enabling the former to engage in the rifling and the latter to be fired in the same manner as in ordinary smooth bore weapons without giving rise to appreciable gas leakage through the grooves of the rifling. In this way, a dual purpose gun is obtained which is capable of firing, both at targets very close to the gun or very distant from the gun, without the necessity of changing the tube as is indispensable with certain infantry accompanying weapons formerly in use.

The artillery piece according to the invention is more particularly remarkable owing to the fact that its bore-tube is provided with very shallow rifling (0.05 to 0.3 millimetre) in which the number of grooves is at least four times as great as that generally adopted and, in any case, greater by one third than the number expressing in millimetres the length of the inner circumference of the bore.

In actual practice, for a 100 millimetre calibre gun, the number of grooves may be as great as several hundred, so that the inner surface of the gun will assume a serrated appearance.

Owing to this particular form of rifling, in which the number of the grooves compensates for their shallowness, it becomes possible, by means of very simple driving bands, to considerably reduce the leakages which are liable to occur between the gyrating projectile and the bore, and thus to reduce the erosion phenomena they set up so as to eliminate one of the principal causes of wear of the bore.

This shallow rifling also offers the advantage of making it possible to easily obtain freedom from leakage of the joint between the bore and the finned projectiles which are fitted with movable driving bands for this purpose as will be explained later.

A further peculiarity of the invention lies in the special manner of constructing and arranging the driving band of the projectiles stabilised by gyration.

It has already been proposed to provide projectiles intended to be fired from muzzle loading rifled-bore mortars of the Stokes type with expanding driving bands. Said mortars comprise a barrel which is at a high angle with respect to the horizon, the breech block of which is provided with a firing-pin permanently protruding from the bottom end of the tube. The projectile is provided at the rear with its propelling charge (a cartridge and additional charges if necessary) inside a perforated tubular tail and around said tail. It is provided with a driving band which does not protrude beyond its calibre when at rest and which does not interfere in the least with the dropping of the projectile into the bore by gravity on loading.

When the shell reaches the bottom of the bore, the cartridge is set off upon striking the firing pin. The pressure of the gases expands the driving band so as to insure engagement with the rifling of the bore.

Nevertheless, the types of driving bands utilised up to the present, whether or not they were capable of being ejected on leaving the gun, were not sufficiently well adapted to the purpose they had to fulfill and have not given the results which were anticipated.

The driving bands provided on the projectiles forming the subject matter of the present invention and which are capable of being ejected, are brought into operation in the known manner by their forward motion on the projectile under the thrust of the gases which, on the round being fired, tend to escape between the driving band and the bore.

According to a peculiarity or the invention, the projectile is provided, at the position occupied by the driving band in its working position, with a roughened surface, knurled or otherwise provided with hollows and projections, intended to make the driving band integral with the projectile by pressure and by compression of the substance.

In one form of embodiment, the driving band, or bands, are positively rendered integral with the projectile by the action of a ramp which forms the forward surface of an annular recess of the chamber of the gun and against which said bands are applied on the shot being fired, the ramp, conical in shape or otherwise, being arranged so as to jam and flatten the driving band in a suitable manner and to compel it, on the one hand, to engage with the rifling of the bore and, on the other hand, to become embedded, as if by stamping, in the roughened surface of the projectile prepared for the purpose of receiving it.

According to a further peculiarity of the invention, the driving bands may be provided with a core made of a strong substance, metal for instance, and a total or partial wrapping of some other substance, metallic or not, such as graphite treated asbestos.

According to another embodiment including the use of several driving bands, some, which serve essentially for driving the shell in rotation, are metallic, whereas the others, the essential purpose of which is to prevent leakage, are made of a more plastic substance.

In another embodiment intended for undercalibrated projectiles, the driving and leak-proof bands are positioned along the periphery of the under-calibration band the outer contour of which then itself assumes a shape suitable for the operation of the first two bands (ramps, knurling, grooves, etc.).

The projectiles stabilised by gyration which are fired by artillery pieces according to the invention can, with advantage, be provided at the rear with a propelling tail or charge-carrier arranged so as to become detached from the projectile when the round is fired.

The present invention extends, in particular, to a special arrangement which makes it possible to bring about said separation. It consists in connecting the tail to the projectile by means of a retaining member, for instance a pin so arranged that it is sheared when the shot is fired. Projections or flanges are provided on the tail with a view to ensuring ejection by the effect of the blast of the gases immediately after the projectile has left the gun.

In a constructional variant, the rifled barrel of an artillery piece according to the invention is mounted in a smooth bore gun in which it is held fast by a clamping device. The thickness of the rifled tube is preferably calculated in such a way that it expands when the round is fired under the action of the pressure and of the heat generated by the gases of the gunpowder so as to press vigorously against the smooth tube in order to prevent any motion of one tube relatively to the other. The clearance allowed between the two tubes and the characteristics of the inner tube are calculated in such a manner that the expansion of the latter which brings it into close contact with the wall of the outer tube may not exceed the elastic strength.

Other advantages and peculiarities of the invention will become apparent in the description about to be set forth:

In the attached drawings which are given solely for example,

Figure 1 is a side view, in elevation, of an artillery piece according to the invention, in firing position, Figure 2 is a part section of a gun provided with ordinary rifling taken at right angles to the axis of the tube, Figure 3 is an explanatory diagrammatic section taken transversely of the tube, showing a gun in which the grooves of the rifling are much wider than the lands which separate them, Figure 4 is a transverse section at right angles to the axis of the tube of a gun according to the invention;

Figure 24 is a side view in section of a standard model of a different form of artillery piece according to the invention, comprising a rifled gun tube removably fitted into a smooth bore gun;

Figure 25 is an end view of the gun in Fig. 24;

Figure 26 is an axial section of a modified detail.

Figure 1:
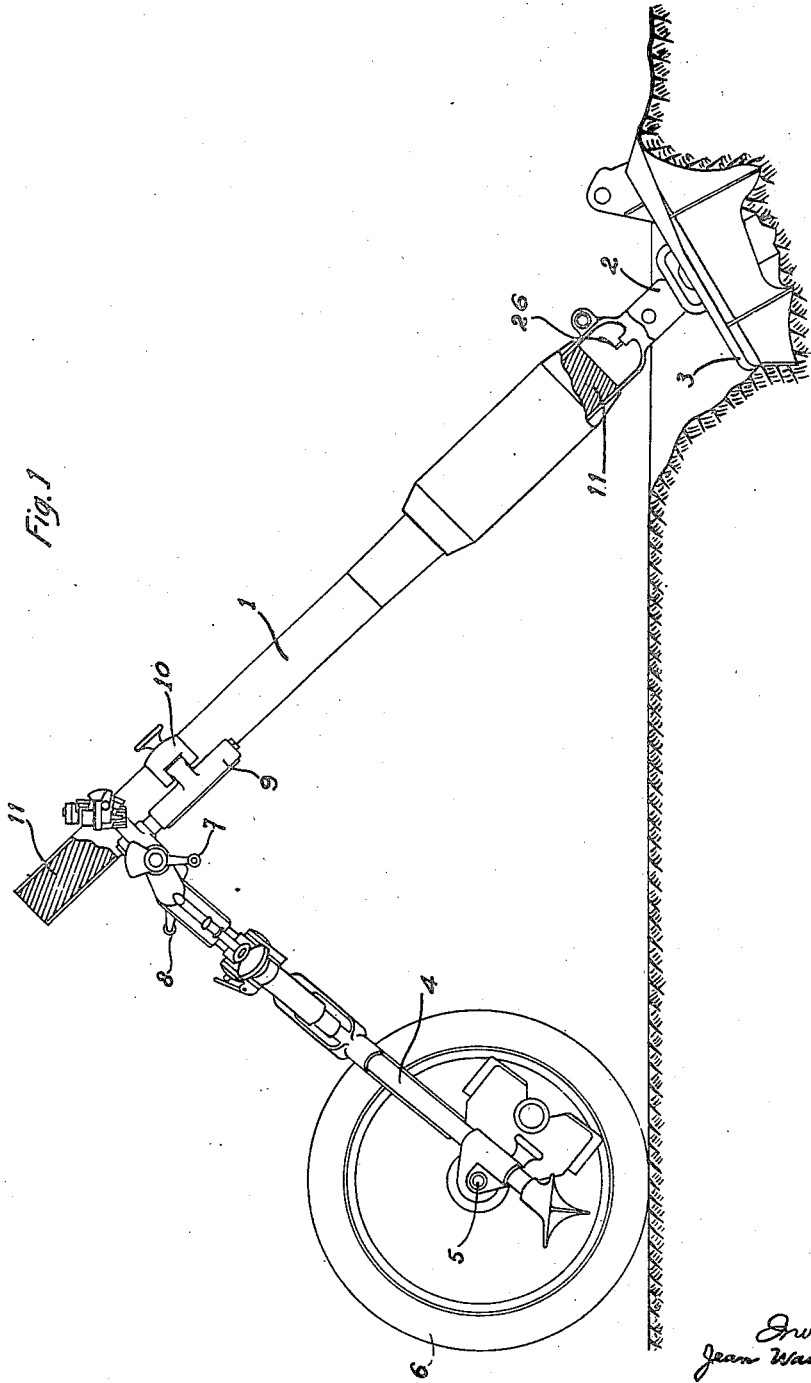

In accordance with the example shown in Fig. 1, the artillery piece comprises a gun tube 1 the breech 2 of which bears on a base plate 3 placed on the ground and the chase of which bears on a two leg mounting 4 fixed to an axle 5 carrying wheels 6. Crank-handles 7 and 8 are used respectively for laying the gun for elevation and direction. The mounting is connected to gun 1 through an elastic connecting device 9 and a collar 10.

Figure 4:
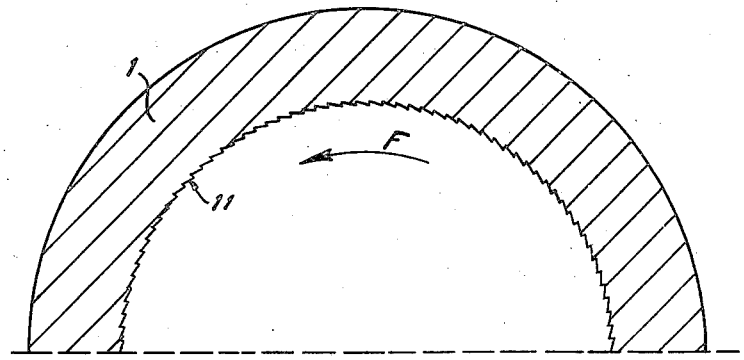

Gun tube 1 is provided with very shallow riflings (0.05 to 0.3 millimetre) the number of which is at least four times as great as that usually adopted (Figs. 1 and 4). In any case, the number of the grooves is greater than one third of the number which represents the length of the inner circumference of the barrel in millimetres.

In practice, in the case of a 100 millimetre calibre gun, the depth of the grooves may be one tenth of a millimeter and there may be several hundred grooves, so that the inside of the bore appears serrated.

Figure 2:
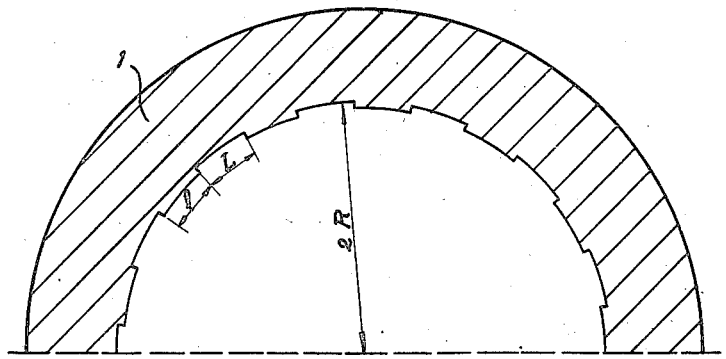

In most present day guns, width L of the grooves is practically equal to the width of lands $l$ which separate them (Fig. 2). It will readily be perceived that, other things being equal, if the width of the grooves is increased at the expense of the lands, as shown in Fig. 3, the resistance due to biting is reduced since the quantity of material crushed by the lands in the driving bands is reduced in proportion to the reduction of the straight section of said lands.

Figure 3:
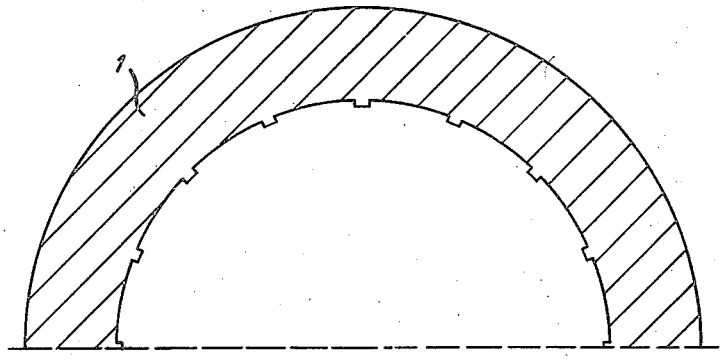

On the other hand, the reduction of the width of the lands as compared with the grooves has the advantage that for a given calibre of the projectile (substantially equal to 2R of the bore measured at the bottom of the grooves) the surface subjected to, the thrust of the gases is greater as shown by a comparison of Fig. 2 and Fig. 3.

Moreover, if the depth of the grooves is reduced while their number is increased so as to retain a similar section of square millimetres in engagement for the purpose of obtaining the rotary propulsion of the projectile, the same couple can be retained while considerably facilitating tight sealing between the projectile and the barrel by means of movable bands of the necessary plasticity.

In this way, the erosion of the bore due to the leakage of gases at high temperatures which occur with ordinary rifling will be reduced to a great extent.

According to the present invention, recourse is had simultaneously to a reduction of the width $l$ of the lands relatively to width L of the grooves, to an increase in the number of said grooves and to a considerable reduction of their depth. By the combined action of these three factors, the benefit of all the advantages indicated above is obtained.

The grooves can, advantageously, be made to assume a serrated shape, as shown in Fig. 4, the smaller side of each tooth facing in the opposite direction to that of the rotation of the projectile which is indicated by arrow F. With a view to reducing wear, the inside of the gun can, with advantage, be treated by any known process likely to increase hardness and resistance to wear; thus it may be chromium plated and polished.

Figure 6:
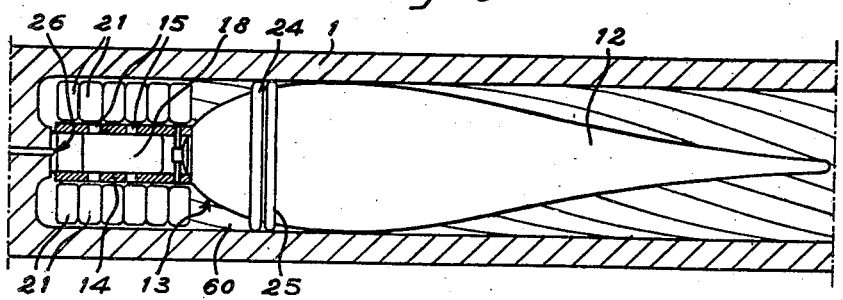
Figure 6 is a view in elevation of a projectile according to the invention, positioned in the breech of the gun.

Figure 6 illustrates a projectile stabilised by gyratory motion which is assumed to be in the breech of the gun in Fig. 1, in firing position. Said projectile includes a front point 12 with a concave outline which merges tangentially with a tapering aerodynamically shaped body, the diameter of which increases up to the main diameter and then decreases as at 13, down to the rear end.

Base 13 is fitted with a tail 14 which supports the propelling charge. In the example shown in Fig. 6, said tail is constituted by a tubular part provided with lateral perforations 15.

Said tail may be permanently attached to the base but, preferably, it is removably fitted so as to become detached from the projectile when the shot is fired.

Figure 23:
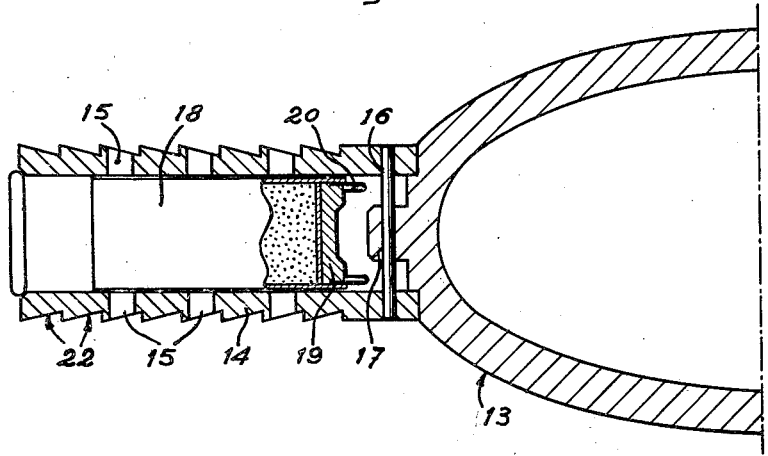
Figure 23 illustrates a projectile fitted with a detachable tail.

Said detachable mounting of the tail 14 may be obtained in the manner shown in Fig. 23 for instance. Tail 14 is secured by a pin 16 passing through a teat 17 provided on base 13. Tail 14 houses a propelling cartridge 18, the front end of which is provided with a washer 19 fitted with a collet 20 capable of shearing pin 16 when the shot is fired and, under the action of the deflagration of cartridge 18, washer 19 is hurled forward.

Around the circumference of the tail, it is possible to fit in known manner, and as in the case of projectiles of the Stokes type for smooth bore mortars, additional charges or relays 21 (Fig. 6) having the shape of rings in a combustible wrapper. Around its outer circumference, the tail 14 is provided with indentations 22 (Fig. 23) or else with facets or flanges intended to provide the gases of the propelling charge with gripping or thrust surfaces sufficient to enable them, when they are suddenly released in the bore, to automatically eject the tail immediately the projectile has left the muzzle as will be explained later in connection with the operation.

With a view to ensuring correct engagement of the rifling as well as a seal between the bore and the projectile, said projectile is provided in rear of the main diameter with one or more mobile driving bands fulfilling these two purposes.

Figure 7:
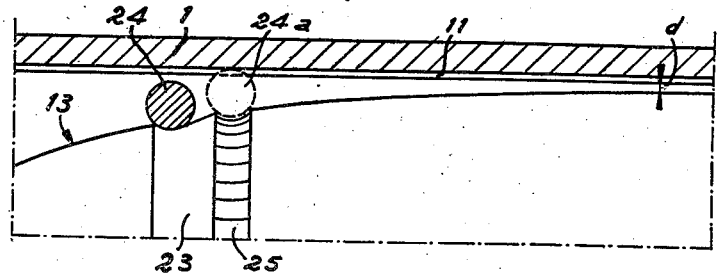
Figures 7 to 13 are fragmentary, longitudinal sectional views, of projectiles according to the invention, fitted with movable driving bands, said projectiles being assumed to be positioned in the breech of the gun shown in Fig. 1, and the movable driving bands being shown without hatchings in their idle position and with hatching in their working position.
Figure 19:
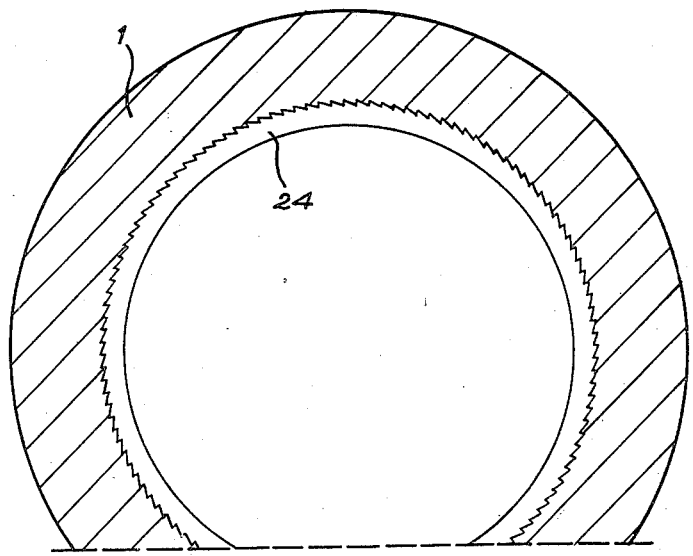
Figure 19 is a cross section of the barrel showing how the driving bands become embedded in the rifling.

According to the example of embodiment shown in Fig. 7, the tapering rear portion 13 of the projectile is provided with a peripheral groove 23 in which an elastic driving band 24 is positioned in its idle position. Ahead of groove 23, the projectile is provided with a zone 25 which is knurled or otherwise provided with hollows and projections. When the shot is fired, the pressure of the gases on the rear portion of the band causes said band to move to position 24a to embed itself both in rifling 11 (Fig. 19) and in zone 25 of the projectile thus ensuring both rotational drive and sealing. Driving band 24 preferably consists of a split metal ring which opens out and is ejected by the effect of centrifugal force on leaving the gun. Owing to the low mass of the driving band as compared with the projectile, its movement from its position at rest to its working position is very rapid and occurs before the projectile itself has entered into motion.

A certain amount of clearance (Fig. 7) is preferably allowed between the barrel and the main diameter of the projectile to allow the shell to slide easily into the gun when, as loading is from the muzzle as shown in Fig. 1, it is desired to accomplish automatic firing. The projectile fitted with its cartridge at the rear (Fig. 6) strikes a fixed firing-pin 26 (Figs. 1 and 6) provided at the bottom of the breech. The impact ignites the primer which causes the deflagration of the cartridge and the automatic positioning of driving band 24 and propulsion of the shell are thus obtained. When additional charges are provided round the circumference of tail 14, said charges are ignited by the jets of flame which are violently expelled from charge 18 through perforations 15.

The gases from the cartridge also propel washer 19 against pin 16 which is sheared (Fig. 23). As soon as the projectile has left the barrel the effect of the sudden expansion of the gases towards the front in the barrel ensures the ejection of tail 14.

The projectile which is thus relieved of the driving band 24 which is expelled by centrifugal force on leaving the muzzle and of the tail 14, presents the most favourable aerodynamic contour and is capable of reaching its maximum range. Its excellent ballistic coefficient enables it to be fired to considerable distances with comparatively low pressures so that the barrel of Fig. 2 can be very light and of the same order of magnitude as the usual smooth bore tube firing only finned projectiles.

The contour of rifling 11 enables the movable driving band 24 to closely assume its shape and to ensure perfect sealing.

Figure 8:
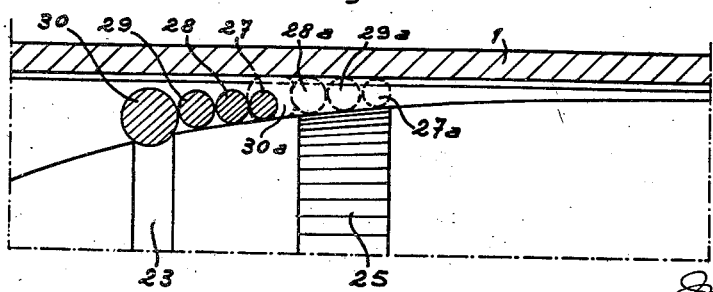

In the example shown in Fig. 8, three metal driving bands 27, 28, 29 are provided and are intended to ensure forcing. Said driving bands are driven forward, on the shot being fired, by a fourth band 30 which is larger in diameter and ensures sealing. Said last band can, with advantage, be made of a more plastic substance than the others as, for instance, of graphite treated asbestos. In the working position, the three driving bands become located at points 27a, 28a and 29a where they engage with knurled zone 25 in the same manner as the single band in Fig. 7. Band 30 moves to point 30a and, in a manner, locks the driving bands in their active position.

Figure 9:
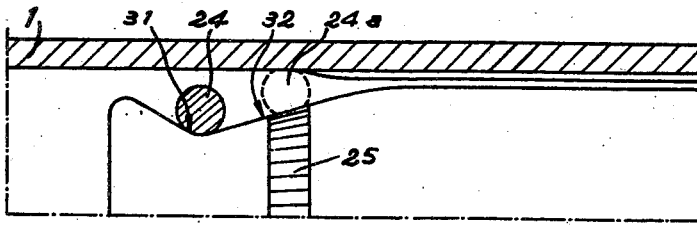

In the example shown in Fig. 9, only one driving band 24, positioned in a groove 31, is provided and is forced by the gases along a forward ramp 32 so as to lodge between the projectile and the barrel as shown at point 24a.

Figure 10:
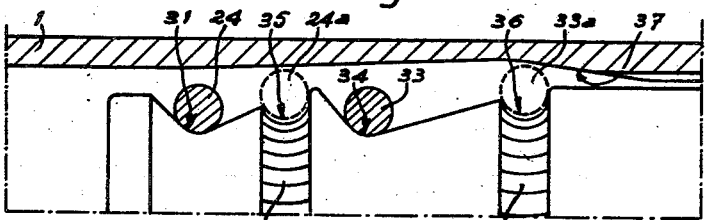

Fig. 10 shows a modification according to which two driving bands 24, 33 are provided. These bands, when at rest, are positioned respectively at the bottom of grooves 31, 34, as in the case of Fig. 9, but, in their working position (shown at points 24a and 33a) become engaged respectively with two other grooves 35 and 36.

A suitably shaped annular recess 37 provided in the barrel of the gun allows the driving bands to move from their idle position to their working position on the projectile and to become locked in working position, the ramp shaped annular recess, the front end of which merges into the barrel, constitutes a forcing cone which, when the projectile advances in the tube under the propelling action of the gases, positively and simultaneously ensures engagement with the rifling and the proper imbedding of knurled grooves 25 in the bands. By this means, rotary drive is obtained perfectly.

The driving bands 24 and 33 may be made of different densities in order that the thrust of the gases may ensure their motion in turn. Rear driving band 24 is preferably made of a substance of greater density than front band 33.

Figure 11:
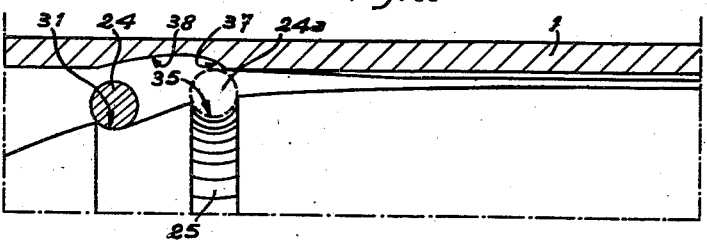

Figure 11 shows an arrangement similar to that of Fig. 10, but only using a single driving band 24. The passing of said band from idle groove 31 to working groove 35 is facilitated by a suitable recess 38 in the bore of the gun. The front portion 37 of the recess is constructed in such a way that the driving band will remain correctly in its groove 35 when in its active position (24a).

Figure 12:
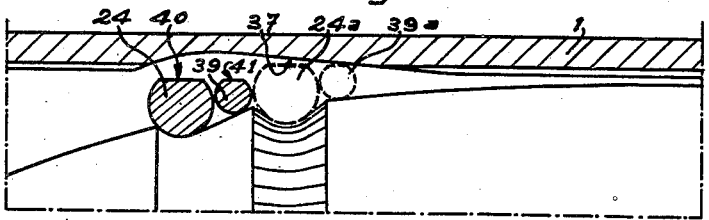

In the example shown in Fig. 12, the shapes of the projectile and barrel are similar to those shown in Fig. 11, but two driving bands 24, 39, are provided and these have flats 40, 41, intended to provide a greater annular surface with a shorter crushing travel in order to obtain at points 24a, 39a, even with very shallow grooves, a sufficient available section of working metal. Rear driving band 24, which is of greater section than band 39, locks the latter in the position shown on the right.

Figure 13:
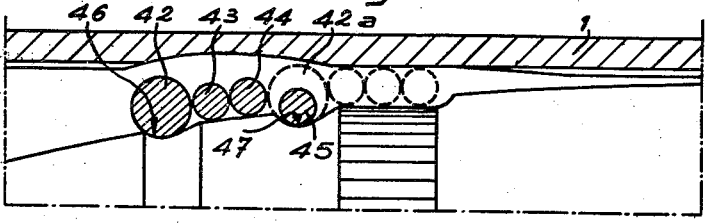

Instead of two driving bands, a greater number might be provided as 42, 43, 44, 45 shown in Fig. 13, where the two extreme driving bands 42 and 45 are each housed respectively in grooves 46 and 47, the front groove 47 accommodating the rear band when it has moved into its working position at point 42a.

Figure 14:
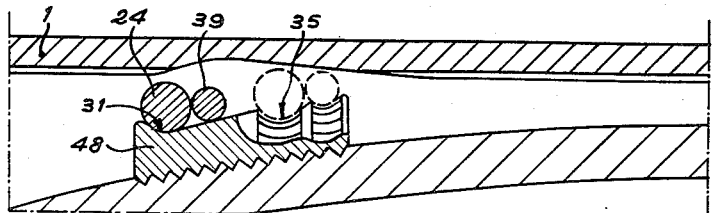
Figure 14 is a longitudinal section, partly in elevation, of a modification.

Figure 14 shows an embodiment similar to that shown in Fig. 12, but driving band 39 and sealing band 24 are mounted in an under-calibration ring 48 capable of being ejected on leaving the gun.

In this case the ring 48 bears grooves 31, 35, instead of the projectile.

Figure 15:
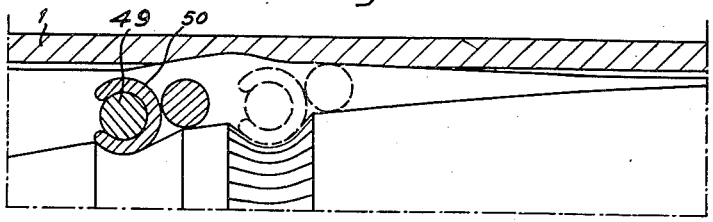
Figures 15 to 18 are views in elevation of other modifications.

In the example shown in Fig. 15, the rear driving band comprises a core 49 partially enclosed in a wrapping 50.

Figure 16:
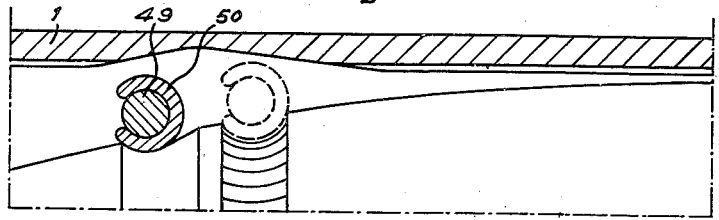

Fig. 16 shows an embodiment similar to that shown in Fig. 15, but including the use of a single driving band with a core 49 and a cover 50.

The driving bands may, advantageously, be coated with decoppering products or with products preventing the coppering of the barrel. They may even, by their own respective constituents, automatically ensure this result.

Figure 17:
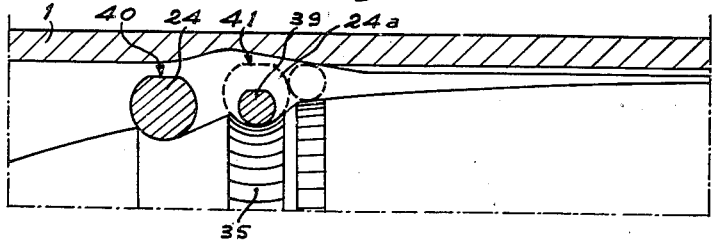

In the example shown in Fig. 17, driving bands 24 and 39 are provided with flats 40, 41, intended to increase the working surfaces engaging the rifling. In its working position, the rear driving band 24 moves into position 24a in the knurled groove, 35, which originally housed driving band 39.

Figure 18:
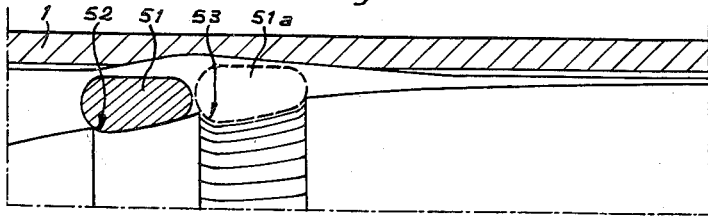

In all the aforementioned examples, the general section of the driving bands is circular as this facilitates their motion. The shape is, however, by no means obligatory and the driving bands may assume any other shape and may, for instance, be flattened like a wedge, as shown at 51, 51a, in Fig. 18. They would then be housed in rest grooves 52 and working grooves 53 assuming a corresponding contour.

Figure 5:
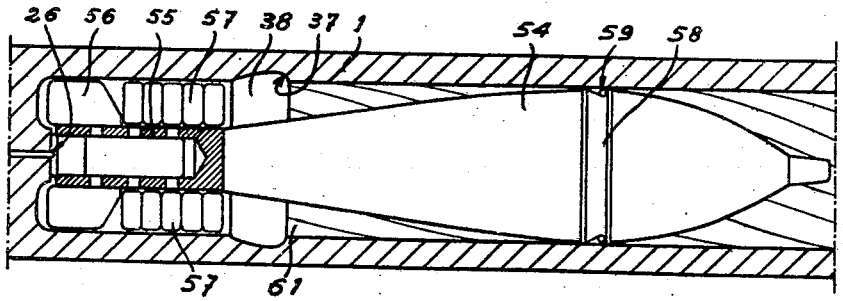
Figure 5 is a view in elevation of a projectile of known type, stabilised by fins, and likewise positioned in the breech of the gun.

The finned projectiles which the present gun is capable of firing, in addition to projectiles stabilised by gyratory motion, are shown in Fig. 5. They are projectiles of a known type comprising an ovoid body 54 terminated by a perforated tail 55 onto which are fitted stabilising fins 56. Tail 55 is integral with the projectile and accommodates cartridge 18 therein and additional charges enclosed in cartridge bags 57 outside thereof.

Figure 20:
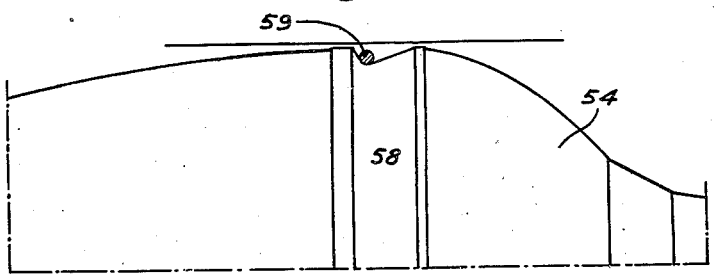
Figure 20 is a partial side view of the finned projectile shown in Fig. 6, showing its leak-proof band in its idle position.
Figure 21:
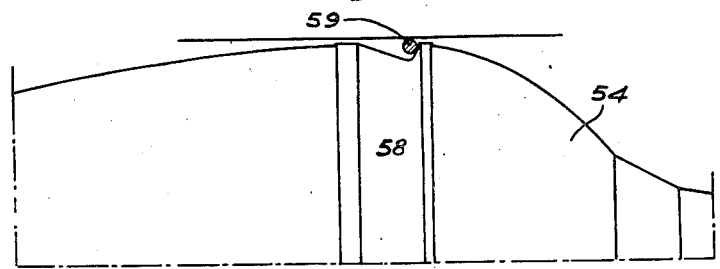
Figure 21 is a view similar to that in Fig. 20, but showing a differently shaped groove with the leak-proof band in working position.

In the neighbourhood of its largest diameter, the projectile bears a groove 58 which accommodates a movable and releasable sealing band 59 of a known type. When the shot is fired, said band moves from the position shown in Fig. 20 to that shown in Fig. 21 under the action of the pressure of the gases which tend to escape between the band and the bore. Figures 20 and 21 represent two different groove contours which can be utilised to accommodate the band 59.

Figure 22:
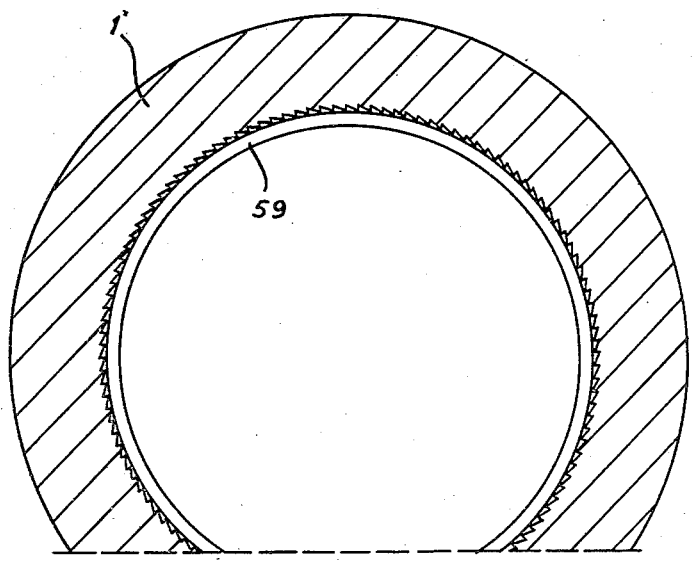
Figure 22 is a section at right angles to the axis of the barrel showing the driving band of Figures 20 or 21 in working position.

Owing to the peculiar shape of the rifling, band 59 ensures satisfactory sealing between the barrel and the projectile (Fig. 22).

By a suitable adjustment of the angle of the ramp in groove 58 (Fig. 21) on which the sealing band 59 assumes its working position and by providing said ramp with a smooth or polished surface, it will be possible to arrange for said band to set up practically no gyration of the finned projectile.

It may however be desirable to impart a certain gyration to said projectile in order to counteract, on the trajectory, any defect of symmetry which it may present. It is thus possible to avoid all abnormal deviation of the projectile and to ensure greater directional accuracy of fire.

This can be easily carried into effect by giving the working ramp a suitable angle so as to obtain the desired driving effect. It is also possible to form the surface of the ramp with more or less accentuated knurling to facilitate a certain rotary drive of the projectile.

The slow gyration of the finned projectile may also be obtained by means of a very slight tilting of fins 56 with respect to the axis of the projectile.

If the two types of shells shown in Figs. 5 and 6 which can both be fired by the gun according to the invention are compared, it will first be observed that the very tapering front of the projectile in Fig. 6 greatly favours its flight through the air when the rifling in the barrel comes into play to impart to it the necessary stabilising effect. Combustion chamber 60 may be much smaller than combustion chamber 61 in Fig. 5, so that the initial pressure developed by the propelling charge is greater, which not only permits a better utilisation of the charge, but by promoting the proper ignition of relays 21, will also permit the employment of slower acting gunpowder providing greater propelling action in the bore.

The effect of all these factors is combined to give the projectile shown in Fig. 6 a much greater range than that of the projectile in Fig. 5.

When employing the gun according to the invention, the projectile shown in Fig. 5 will therefore be reserved for high angle, short range, fire.

In order to reach greater ranges, the projectile shown in Fig. 6 will be used, the angle of fire of said projectile being of course limited to a magnitude compatible with the normal conditions of fire with projectiles stabilised by gyration.

Automatic percussion by gravity can be obtained for all angles of the gun between approximately 20 degrees and 90 degrees. If it is desired to fire at smaller angles a controlled percussion breech might be used and the projectile would be loaded by means of a rammer.

It should moreover be noted that gun 1 might be provided with a movable breech, it being possible to load the projectiles shown in Figs. 5 and 6 both from the breech and the muzzle of the gun.

In the event of it being desired to reduce the clearance between the projectiles and the barrel to a minimum, and when the free section of the grooves is not sufficient to allow the air to escape towards the front without unduly retarding the dropping of the projectile in the barrel when loading, a valve might be provided in the breech for the ejection of the air, said valve being so arranged as to close automatically under the action of the propelling gases.

The existing artillery projectiles stabilised by gyratory motion can be fired from the gun according to the invention, at will; for this purpose it will only be necessary to provide them with driving bands of the type hereinabove described, and with a charge-carrying tail of the kind represented in Fig. 5.

Figures 24 and 26 show a modified form of artillery piece according to the invention. Rifled tube 70 is mounted within a smooth bore tube 71 into which it is slipped when it is desired to fire projectiles stabilised by gyration. The outer diameter of the rifled tube is very slightly less than the calibre of the smooth bore tube so that it may be readily extracted from the latter.

Owing to the thinness of tube 70, the expansion to which it is subjected when the shot is fired under the action of the pressure of the gases and of the heat generated, applies it firmly against the bore of tube 71. Owing to the adhesion set up between the two tubes, any undesirable pivoting of the rifled tube with respect to the smooth tube is prevented.

A sleeve 62 is fixed to the end of tube 71, the front end of said sleeve being provided with a rim portion 63 having two slots 64 intended to allow the passage of lugs 65 of corresponding shape which are integral with the rifled tube. The tube 70 is rotated to direct the lugs 65 under and within the rim 63, thus forming a bayonet joint. A clamping screw 66, passing through sleeve 62 is capable of coming into engagement with a notch on one of the lugs in order to secure the inner tube against any motion relatively to the outer tube.

The rifled tube may be provided with a breech 67 and a firing pin 68 (Fig. 24), or it may be left open at its lower end (Fig. 26) so that the same firing pin 26 then serves for both tubes.

This artillery piece is capable of firing three different types of projectiles, the rifled tube being capable of employing projectiles of the nature of those shown in Figures 5 and 6, while the smooth bore tube is reserved for firing projectiles of greater calibre, with a high specific capacity, such as gas shells stabilized by fins.

It is to be understood that the invention has been shown and described only for purposes of illustration and that it may be modified in various ways without departing from the spirit of the invention.

I claim:

An artillery piece comprising a rifled gun barrel, a smooth bore tube surrounding said rifled gun barrel, lugs fixed to the outer surface of said rifled barrel adjacent one end thereof, a sleeve secured to the muzzle end of said smooth bore tube and having a rim portion extending inwardly toward the rifled gun barrel, said rim portion being provided with slots similarly shaped with respect to the lugs on said rifled gun barrel whereby said lugs are adapted to be passed through said slots and to become disposed within said rim portion upon manipulation of the rifled gun barrel, and locking means engageable with said lugs for locking the rifled gun barrel within said sleeve.

JEAN WAUTERS.